United States Patent
Noles, Jr.

(10) Patent No.: US 6,969,427 B1
(45) Date of Patent: Nov. 29, 2005

(54) APPARATUS FOR APPLYING MULTI-COMPONENT LIQUID LINER COMPOSITIONS TO THE INNER SURFACES OF CONDUITS AND METHODS OF APPLYING SAME

(75) Inventor: Jerry W. Noles, Jr., Pasadena, TX (US)

(73) Assignee: Advanced Coiled Tubing, Inc., Houston, TX (US)

( * ) Notice: Subject to any disclaimer, the term of this patent is extended or adjusted under 35 U.S.C. 154(b) by 914 days.

(21) Appl. No.: 09/724,070

(22) Filed: Nov. 28, 2000

(51) Int. Cl.[7] .......................... B29C 31/00; B05B 12/00
(52) U.S. Cl. .......................... 118/317; 118/323; 138/97; 137/15.01; 405/184.1; 425/11
(58) Field of Search ............................... 118/317, 323; 427/236, 238; 138/97; 137/15.01; 405/184.1; 425/11

(56) References Cited

U.S. PATENT DOCUMENTS

| | | | |
|---|---|---|---|
| 3,039,428 A | | 6/1962 | McLean |
| 3,598,636 A | | 8/1971 | Honeycutt, Jr. |
| 4,252,763 A | | 2/1981 | Padgett |
| 4,627,471 A | | 12/1986 | Parkes et al. |
| 4,670,305 A | | 6/1987 | Morgenthaler et al. |
| 5,019,417 A | | 5/1991 | Northcutt |
| 5,081,168 A | | 1/1992 | Edwards et al. |
| 5,092,265 A | * | 3/1992 | Hughes et al. .............. 118/317 |
| 5,181,962 A | | 1/1993 | Hart |
| 5,215,781 A | | 6/1993 | Lowther |
| 5,298,281 A | * | 3/1994 | Lowther ..................... 427/128 |
| 5,368,669 A | | 11/1994 | Maine et al. |
| 5,814,162 A | * | 9/1998 | Barrett et al. ............ 134/22.12 |

FOREIGN PATENT DOCUMENTS

| | | |
|---|---|---|
| EP | 0145266 | 6/1985 |
| EP | 0178870 | 4/1986 |
| EP | 0485653 A1 | 5/1992 |
| GB | 1150810 | 5/1969 |
| GB | 1162533 | 8/1969 |

OTHER PUBLICATIONS

Clemtex, Inc. Corrosion Control Equipment and Supplies Catalog, undated, Houston, Texas.
Clemtex, Inc. Corrosion Control Equipment and Supplies Flyer, undated, Houston, Texas.
Clemtex, Inc. Corrosion Control Equipment and Supplies Flyer, undated, Houston, Texas.
Paschalides, In Situ Pipeline Coating: An Alternative to Line Replacement, Pipes & Pipelines International, Jun. 1980, pp. 18-19.
Munden, In Situ Rehabilitation Cleans, Lines and Renews Pipe Systems, Pipe Line Industry, Apr. 1990, pp. 38-39.

(Continued)

*Primary Examiner*—Mark Kopec
(74) *Attorney, Agent, or Firm*—Andrews Kurth LLP; Anthony F. Matheny (57) ABSTRACT

The invention is directed to an apparatus, or system, for applying a multi-component liquid liner composition to an inner surface of a conduit. The system comprises a first reservoir having a first liquid liner component; a second reservoir having a second liquid liner component, the second liquid liner component being different from the first liquid liner component; a first liquid liner component transmission line in communication with the first reservoir; a second liquid liner component transmission line in communication with the second reservoir; and an applicator in communication with the first and second liquid liner component transmission lines. Methods of applying multi-component liquid liner compositions to the inner surface of conduits are also disclosed.

11 Claims, 3 Drawing Sheets

OTHER PUBLICATIONS

De Jong, Chapter 12 The Latest Techniques in the Field of Pipeline Renewal, Internal & External Protection of Pipes—Proceedings of the 8th International Conference, 1990, pp. 155-168, The Fluid Engineering Centre, Cranfield Bedford, UK.

Alberts, et al., Chapter 13 In Situ Pipecoatings Curing at Temperatures Down 0°C, Internal & External Protection of Pipes—Proceedings of the 8th International Conference, 1990, pp. 169-176, The Fluid Engineering Centre, Cranfield, Bedford, UK.

Kut, et al., Liquid Two-Component Internal and External Pipe Coatings, The First Mediterranean Oil & Gas Exhibtion and Conference, Jan. 28-31, 1991, Malta.

Daily, Internal Coating Using the Double-Pig System, Pipe Line Industry, Mar. 1991, pp. 66-70.

Davis, The Use of Internal Plastic Coatings to Mitigate CO2 Corrosion in Downhole Tubulars, The Annual Conference and Corrosion Show Sponsored by NACE International, 1994, pp. 23/1-23/8.

Morrison, Down Hole Corrosion: Problems & Possible Solutions, SPE Eastern Regional Meeting, Sep. 17-21, 1995, pp. 89-95, Society of Petroleum Engineers, Inc., Morgantown, West Virginia.

Thompson, et al., Evaluation of Coatings for the Protection of Downhole Production Tubing, The Annual Conference and Corrosion Show Sponsored by NACE International, 1997, pp. 66/1-66/10.

Jelinek, Testing and Use of In Situ Pipeline Internal Coatings in the North Sea, Materials Performance, Aug. 1999, pp. 38-42.

Pipeline Risk Assessment, Rehabilitation, and Repair, An International Mangement and Technical Conference, Pipe Line Industry and Pipes & Pipelines International, May 29-23, 1991, Houston, Texas, Title Page & Order Info only.

Omar, In-Situ Cement Lining of Pipelines, Saudi Arabian Oil Company (Saudi Aramco), undated.

Petroleum Abstract Search Service, University of Tulsa, Mar. 20, 2000, pp. 1-53.

* cited by examiner

APPARATUS FOR APPLYING MULTI-COMPONENT LIQUID LINER COMPOSITIONS TO THE INNER SURFACES OF CONDUITS AND METHODS OF APPLYING SAME

BACKGROUND OF THE INVENTION

1. Field of the Invention

This invention relates to an apparatus, or system, for applying a multi-component liquid liner composition to the inner surface of a conduit, and in particular, well bore tubing, while the conduit remains in place. The invention also relates to methods for applying a multi-component liquid liner composition to the inner surface of conduits.

2. Description of Related Art

During the past several years, the oil and gas industry has been challenged to find new ways for improving operating efficiencies while meeting the ever increasing demand for oil and gas. With overall production output dropping below consumption levels, it has become increasingly important for producers to maximize their current production. This requires that they minimize any downtime when a well must be pulled out of service for workover operations.

One of the most costly workover operations is the pulling and replacement of the production tubulars, i.e., well bore tubing ("tubing") or casing. These conduits are a primary means for pressure containment and oil and gas transfer during production. If the production tubulars fail, a loss of well control may result with the further possibility of an uncontrolled release of gas and oil from the well.

Many of the wells that are currently producing have developed wall thickness reductions in the well bore tubing that may eventually lead to a leak or failure. Wall thickness reductions usually occur due to corrosion and erosion over a period of time. Corrosion occurs when fluids, such as salt water or other corrosive fluids, are produced during normal oil and gas production. Certain fluids and gases chemically attack the metal of the well bore tubing causing general loss of wall thickness and localized pitting of the well bore tubing until the wall is eventually breached. Erosion causes wall thickness losses due to the physical contact and the gouging action of abrasive particles, such as sand, carried by the produced fluids.

One way to prevent corrosion and reduce erosion is to install tubing that has an internal protective coating. These coatings can reduce wall loss, greatly extending the life of the tubing and reducing the need for workover operations. However, internally coated tubing is very expensive and requires that the existing tubing be pulled and new tubing installed.

In another approach, a continuous length of solid lining material, e.g., plastic or polyethylene pipe, is inserted into the tubing of the well. The solid lining material is pulled into the conduit or inserted through an outside-diameter-reduction unit and held in tension with weight or other means until the solid lining material is sufficiently deformed to permit installation of the solid lining material into the conduit. The solid lining material is then positioned at, e.g., lowered to, the desired location in the conduit, e.g., at a zone located at a specific depth, e.g., 1,000 feet. The tension is then released and the solid lining material is allowed to relax and expand, or lay loosely, against the inner surface of the conduit.

This lining method has many disadvantages. For example, it requires expensive equipment that is not always available. Additionally, in some instances, sections of the plastic liner must be removed from inside of the conduit to allow valves and other assemblies in the conduit to function correctly. Moreover, this method is time consuming and problematic to perform due to varying dimensions and configurations of the valves and other assemblies in the production tubing. As such, this method generally requires special tools to be designed, fabricated, and operated for removing the plastic liner from the inside of each of these assemblies. This process also requires the use and transportation of large, specialized equipment for each operation. As mentioned above, the equipment is not readily available in many areas and it is contemplated that the equipment, when available, may not permit safe operations on pressure-containing conduits.

Another approach involves a method that requires placement or injection of a liquid coating between two pigs, or wiper plugs, and moving the wiper plugs at a pre-determined rate along the inner surface of the conduit over a desired distance. Liquid coating is located between the wiper plugs and is applied to the inner surface of the conduit between the wiper plugs as the wiper plugs move along the inner surface. This process is referred to as an "in-situ" coating because it permits the conduit to remain in place, or in its operational location, while the coating is applied.

While in-situ coating is used in various pipeline applications, it has not been successfully used in production tubular applications or many other applications due to various shortcomings. For example, in-situ coating methods require the use of a liquid coating material that will stay in a liquid state for extended periods of time to avoid curing, or hardening, between the wiper plugs while the plugs move along the inner surface of the conduit. Additionally, the use of wiper plugs requires two openings in the conduit. The first opening is the insertion point and the second opening is the exit point. Therefore, the wiper plugs move along the inner surface from the insertion point to the exit point.

Generally, the liquid coating material in this method is either a single component liquid, or a multi-component liquid that is mixed prior to transmitting the liquid to the application site, i.e., the location along the inner surface of the conduit desired to be coated by the liquid coating material. In these prior attempts, the liquid cures prematurely and prevents the successful coating of the inner surface of the tubing. For example, extended time periods for transmission of the liquid coating material through the conduit and elevated temperatures at the application site have been determined to cause these liquid coating materials to cure prematurely.

Additionally, because the conditions, e.g., temperature, pressure, humidity, etc., may vary at different application sites along the inner surface of the conduit, the premixed liquid cannot be customized for the varying conditions at the application sites. This lack of flexibility has resulted in liquid coating compositions that either cure too quickly, or, in many cases, not at all. Additionally, this practice does not allow the chemical(s) or liquid component(s) to be tailored during the process and may not be used when the conduit is limited to a single opening. Therefore, in many instances, the inner surface of the tubing is not adequately coated by the single or multi-component liquid coating compositions currently employed.

Accordingly, prior to the development of the present invention, there has been no system for applying a multi-component liquid liner composition to the inner surface of a conduit and method of applying a multi-component liquid liner composition to the inner surface of a conduit, which: permits in-situ coating of production tubulars without having the liquid coating composition cure prematurely; permits coating of the inner surface of the production tubulars without having to extract old tubing and replace with new tubing; permits the application site to be more easily targeted around valves and other assemblies; decreases the amount of time production of oil and gas is interrupted; permits independent, or isolated, transmission of liquid liner components to the application site; and is less expensive than tubing replacement using new conventional tubing or tubing that is pre-coated prior to installation in the well. Therefore, the art has sought a system for applying a multi-component liquid liner composition to the inner surface of a conduit and method of applying a multi-component liquid liner composition to the inner surface of a conduit which: permits in-situ coating of production tubulars without having the liquid coating composition cure prematurely; permits coating of the inner surface of the production tubulars without having to extract old tubing and replace with new tubing; permits the application site to be more easily targeted around valves and other assemblies; decreases the amount of time production of oil and gas is interrupted; permits independent, or isolated, transmission of liquid liner components to the application site; and is less expensive than tubing replacement using new tubing or tubing that is pre-coated prior to installation in the well.

SUMMARY OF INVENTION

In accordance with the invention the foregoing advantages have been achieved through the present system for applying a multi-component liquid liner composition to an inner surface of a conduit comprising: a first reservoir having a first liquid liner component; a second reservoir having a second liquid liner component, the second liquid liner component being different from the first liquid liner component; a first liquid liner component transmission line in communication with the first reservoir; a second liquid liner component transmission line in communication with the second reservoir; and an applicator in communication with the first liquid liner component transmission line and the second liquid liner component transmission line.

A further feature of the system for applying a multi-component liquid liner composition to an inner surface of a conduit is that the first and second reservoirs and first and second liquid liner component transmission lines may be in communication with a multi-port pump. Another feature of the system for applying a multi-component liquid liner composition to an inner surface of a conduit is that the first and second liquid liner component transmission lines may be adjacent each other to form a control line. An additional feature of the system for applying a multi-component liquid liner composition to an inner surface of a conduit is that the control line may include a power source line. Still another feature of the system for applying a multi-component liquid liner composition to an inner surface of a conduit is that the power source line may be electric. A further feature of the system for applying a multi-component liquid liner composition to an inner surface of a conduit is that the power source line may be pneumatic. Another feature of the system for applying a multi-component liquid liner composition to an inner surface of a conduit is that the control line may be coiled. An additional feature of the system for applying a multi-component liquid liner composition to an inner surface of a conduit is that the control line may be maintained on a reel. Still another feature of the system for applying a multi-component liquid liner composition to an inner surface of a conduit is that the applicator may be a directional spray nozzle. A further feature of the system for applying a multi-component liquid liner composition to an inner surface of a conduit is that the applicator may be a centrifugal spray nozzle. Another feature of the system for applying a multi-component liquid liner composition to an inner surface of a conduit is that the first and second liquid liner component transmission lines may be coiled.

In accordance with the invention the foregoing advantages have also been achieved through the present method of applying a multi-component liquid liner composition to an inner surface of a conduit, comprising the steps of: providing a conduit having an inner surface; transmitting a first liquid liner component to an application site disposed on the inner surface of the conduit; transmitting a second liquid liner component to the application site, the second liquid liner component being different from the first liquid liner component; mixing the first liquid liner component with the second liquid liner component at the application site to form a multi-component liquid liner composition; and applying the multi-component liquid liner composition to the inner surface of the conduit at the application site.

A further feature of the method of applying a multi-component liquid liner composition to an inner surface of a conduit is that a third liquid component liner component may be transmitted to the application site and mixed with the first and second liquid liner components to form the multi-component liquid liner composition applied to the inner surface of the conduit at the application site. Another feature of the method of applying a multi-component liquid liner composition to an inner surface of a conduit is that the multi-component liquid liner composition may include at least two additional liquid liner components that are transmitted to the application site and mixed with the first and second liquid liner components to form the multi-component liquid liner composition applied to the inner surface of the conduit at the application site. An additional feature of the method of applying a multi-component liquid liner composition to an inner surface of a conduit is that the conduit may be production tubulars and the application site may be disposed at least 200 feet below ground. Still another feature of the method of applying a multi-component liquid liner composition to an inner surface of a conduit is that the multi-component liquid liner composition may be applied to the inner surface of the conduit by centrifugal spraying.

In accordance with the invention the foregoing advantages have also been achieved through the present method of applying a multi-component liquid liner composition to an inner surface of a conduit, comprising the steps of: providing a conduit having an inner surface; transmitting a first liquid liner component to an application site disposed on the inner surface of the conduit; transmitting a second liquid liner component to the application site, the second liquid liner component being different from the first liquid liner component; applying the first liquid liner component to the inner surface of the conduit at the application site; and applying the second liquid liner component to the inner surface of the conduit at the application site thereby forming a multi-component liquid liner composition disposed on the inner surface of the conduit at the application site.

A further feature of the method of applying a multi-component liquid liner composition to an inner surface of a conduit is that at least one additional liquid liner component may be transmitted to the application site and applied to the inner surface of the conduit to form the multi-component liquid liner composition disposed on the inner surface of the conduit at the application site. Another feature of the method of applying a multi-component liquid liner composition to an inner surface of a conduit is that the conduit may be production tubulars and the application site may be disposed at least 200 feet below. An additional feature of the method of applying a multi-component liquid liner composition to an inner surface of a conduit is that the first and second liquid liner components may be applied to the inner surface of the conduit by centrifugal spraying.

The apparatus for applying multi-component liquid liner compositions to the inner surfaces of conduits and methods of applying multi-component liquid liner compositions to the inner surfaces of conduits have the advantages of: permitting in-situ coating of production tubulars without having the liquid coating composition cure prematurely; permitting coating of the inner surface of the production tubulars without having to extract old tubing and replace with new tubing; permitting the application site to be more easily targeted around valves and other assemblies; decreasing the amount of time production of oil and gas is interrupted; permitting independent, or isolated, transmission of liquid liner components to the application site; and being less expensive than tubing replacement using new tubing or tubing that is pre-coated prior to installation in the well.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

The invention is directed to an apparatus, or system, for applying a multi-component liquid liner composition to an inner surface of a conduit. Multi-component liquid liner compositions are generally preferred, or required, under certain application conditions, including, but not limited, to high temperatures. If mixed before transmission, or delivery, to the application site, high temperatures inside the conduit can cause an accelerated reaction and curing of multi-component liquid liner compositions before they can be applied to the inner surface of the conduit. Therefore, one aspect of the present invention is directed to a system that isolates the individual liquid liner components of the multi-component liquid liner composition until just prior to the multi-component liquid liner composition being applied to the inner surface of the conduit.

It is contemplated that isolation of liquid liner components may provide additional benefits in applications where intermittent operations are being performed. Isolation of the liquid liner components can avoid premature reaction and hardening of the multi-component liquid liner composition while the pump is disengaged for prolonged periods of time. Additionally, isolation of the liquid liner components with multiple transmission lines permits changes in the multi-component liquid liner composition during the course of the application of the multi-component liquid liner composition to the inner surface of the conduit, thereby allowing the multi-component liquid liner composition to be tailored to the specific application, and/or conditions at the application site. Moreover, isolating individual liquid liner components allows for base components and catalysts or accelerators to be used as liquid liner components and mixed in a more controlled manner at the point of application, thereby avoiding premature curing or thickening of the multi-component liquid liner composition during application of the multi-component liquid liner composition to the inner surface of the conduit.

Figure 1:
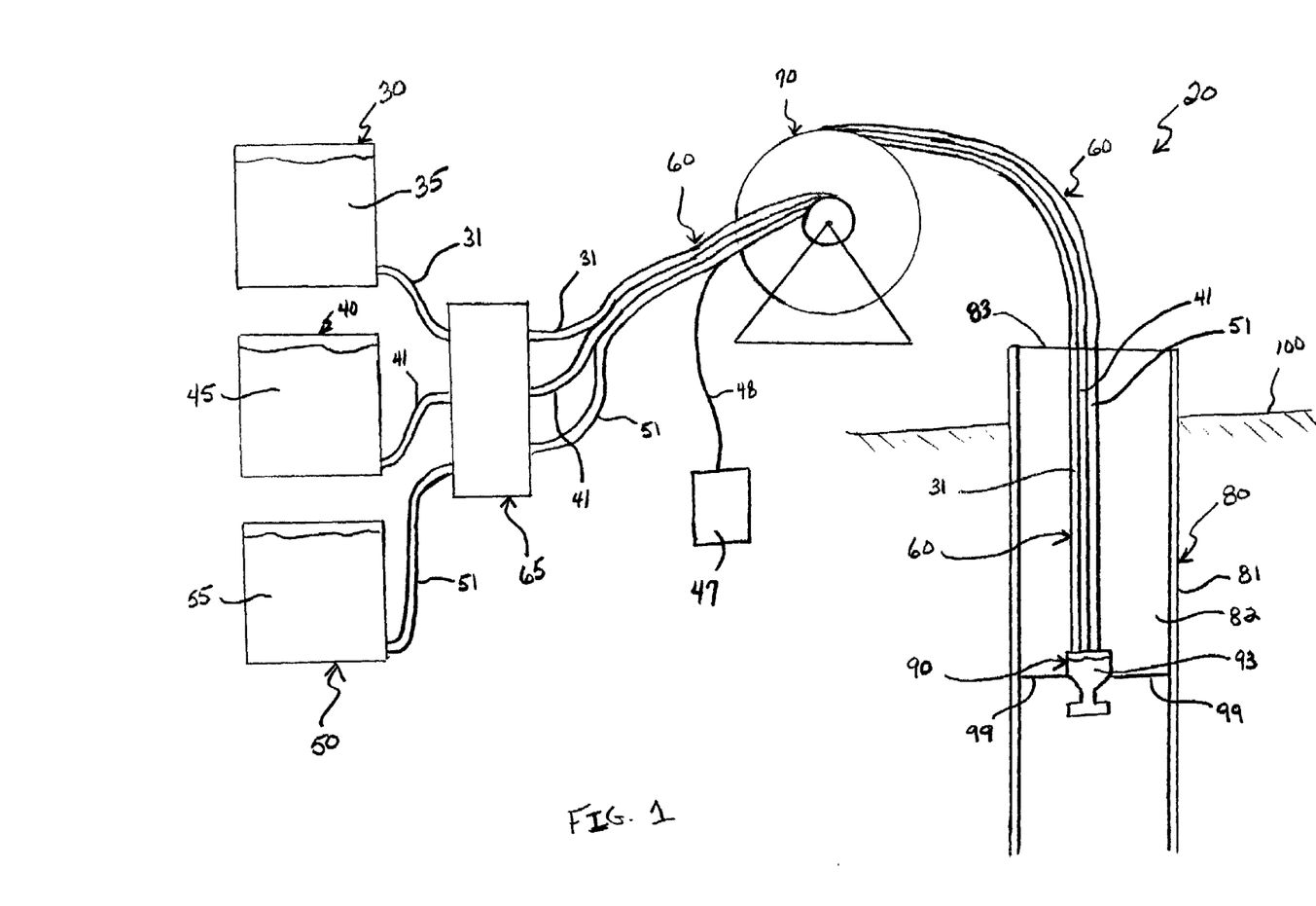
FIG. 1 is side view of one specific embodiment of the system for applying a multi-component liquid liner composition to the inner surface of a conduit.
Figure 2:
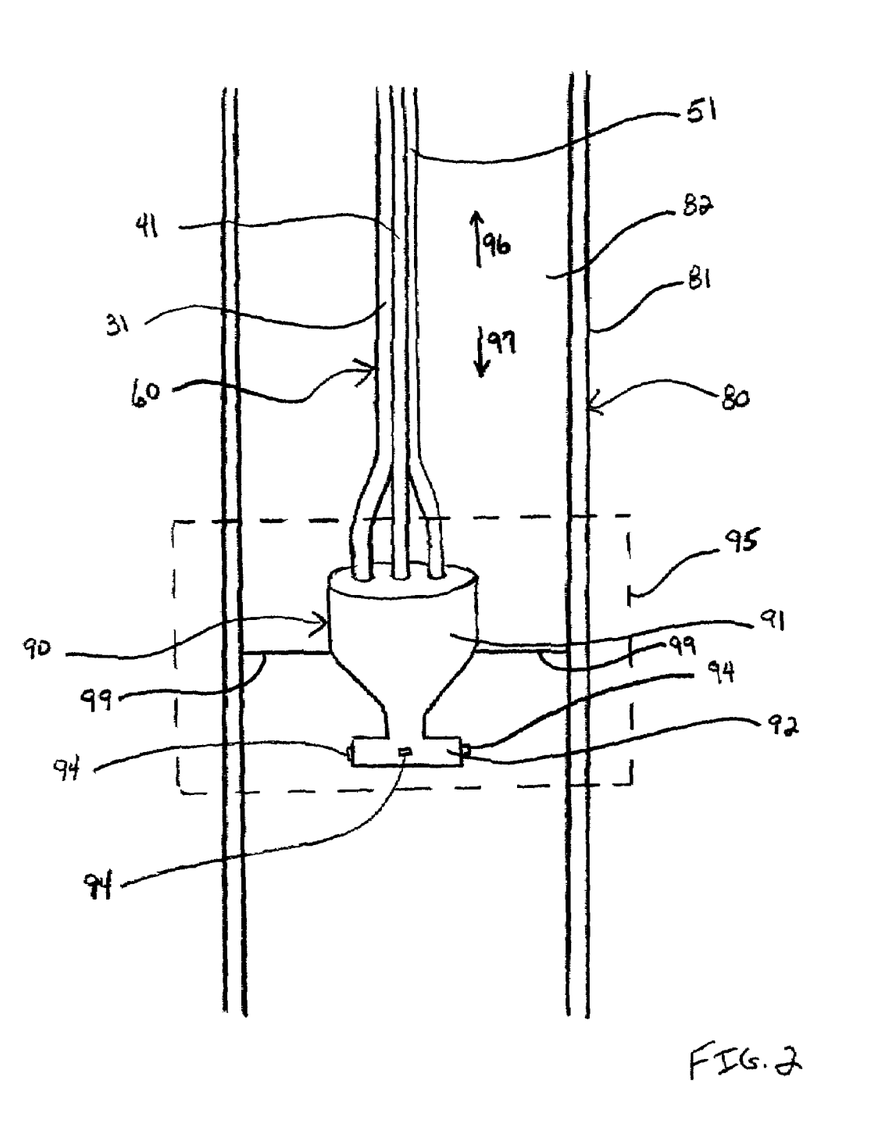
FIG. 2 is a side view of the conduit and the applicator of the system for applying a multi-component liquid liner composition shown in FIG. 1.
Figure 3:
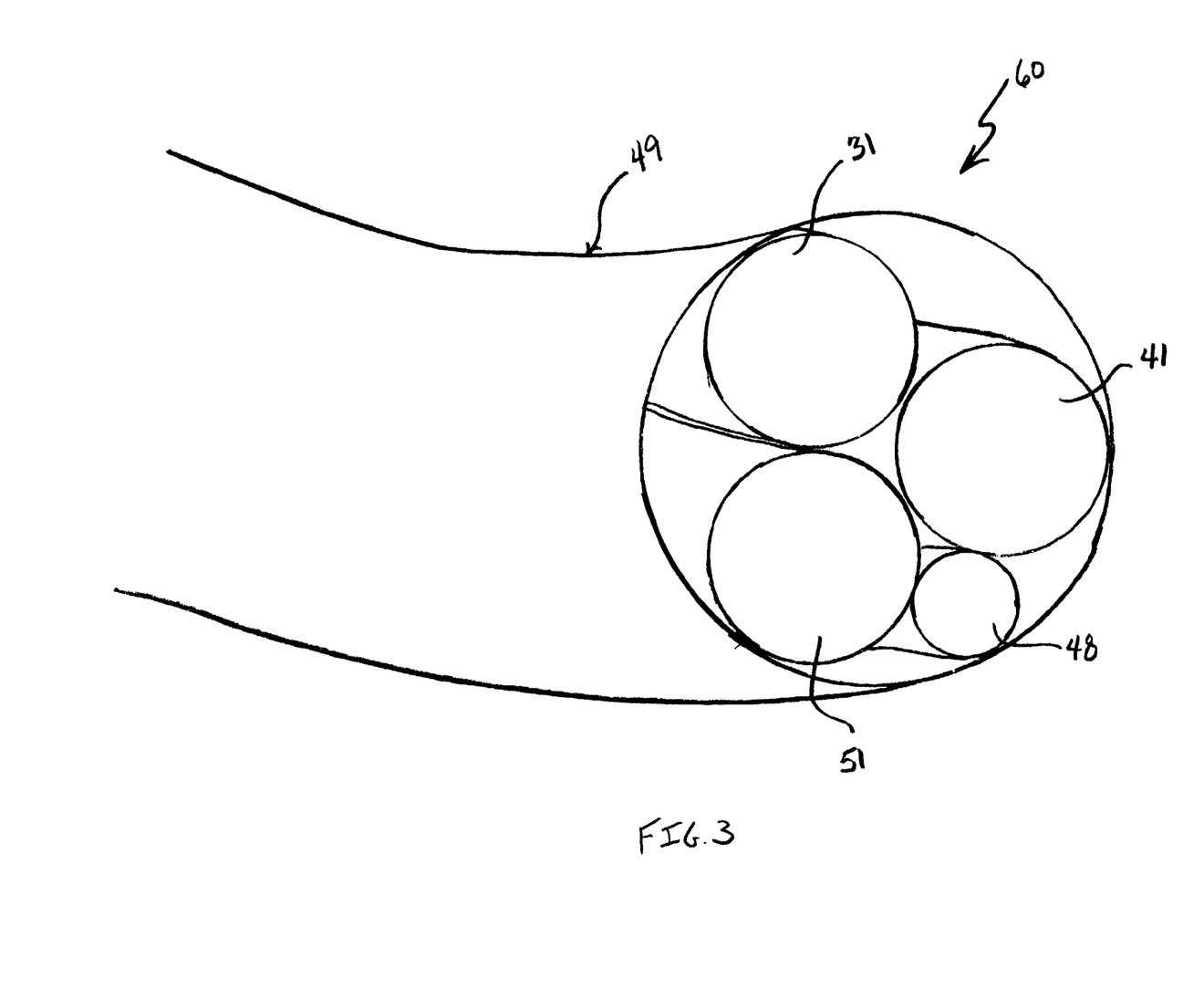
FIG. 3 is a cross-sectional view of the control line of another specific embodiment of the system for applying a multi-component liquid liner composition.

Referring now to FIGS. 1–3, broadly, the system 20 includes first reservoir 30, first liquid liner component transmission line 31 in communication with first reservoir 30, second reservoir 40, second liquid liner component transmission line 41 in communication with second reservoir 40, third reservoir 50, and third liquid liner component transmission line 51 in communication with third reservoir 50. First reservoir 30 includes first liquid liner component 35, second reservoir includes second liquid liner component 45, and third reservoir includes third liquid liner component 55. Generally, first liquid liner component 35, second liquid liner component 45, and third liquid liner component 55 are different chemicals that when mixed or combined cure, or harden, to form a solid compound or coating, i.e., the multi-component liquid liner composition 93, such as a resin, thereby forming a liner, or coating, at application site 95 along inner surface 82 of conduit 80.

It is to be understood that first liquid liner component 35, second liquid liner component 45, and third liquid liner component 55 all do not have to be different from each other provided at least two of the liquid liner components are different from each other. First liquid liner component 35, second liquid liner component 45, and third liquid liner component 55 are readily known to persons skilled in art. Additionally, persons of ordinary skill in the art can easily formulate multi-component liquid liner compositions 93 as desired or necessary due to conditions at the application site 95 to facilitate effective coating of inner surface 82 of conduit 80. In one preferred embodiment, first liquid liner component 35 is a base material, or epoxy resin such as Sovachem Tank Liner 8-Series 2 Pack Chemical Resistant Epoxy Tank Lining sold and distributed by Jotun Paints, Inc. of Norway with distributors in Houston, Tex. and second liquid liner component 45 is a catalyst or harder such as 8T1 catalyst sold by Jotun Paints, Inc. First liquid liner component 35 and second liquid liner component 45 are preferably present in a ratio of 6 to 1 based upon volume. In this embodiment, third liquid liner component 55 is not required. Additionally, the multi-component liquid liner composition 93 formed in this embodiment provides both corrosion and wear resistance at temperatures up to 350° F.

The speed at which the multi-component liquid liner composition 93 solidifies is dependent upon numerous conditions, such as the humidity, the temperature, the pressure, etc. at application site 95. Because many of these conditions vary from application site to application site along the inner surface, system 20 keeps first liquid liner component 35 separate from second liquid liner component 45 and third liquid liner component 55 until just seconds before the multi-component liquid liner composition 93 is to be applied to inner surface 82 of conduit 80. Therefore, a multi-component liquid liner composition 93 can be tailored to the conditions at the application site 95.

As shown in FIGS. 1–3, first liquid liner component transmission line 31, second liquid liner component transmission line 41, and third liquid liner component transmission line 51 are preferably adjacent to each other to form integrated line, or control line, 60. In this arrangement liquid liner component transmission lines 31, 41, 51 are maintained in one line and may be easily managed by the operator of the system 20.

In a preferred embodiment, liquid liner component transmission lines 31, 41, 51 are braided, or twisted or coiled, with each other to form control line 60. In another preferred embodiment, control line 60 includes an outer jacket or sheath 49 (FIG. 3) that protects control line 60 from damage and provides the control line 60 a uniform circular cross-section, or tubular shape. Additionally, control line 60 is preferably coiled, thereby permitting control line 60 to be disposed on a reel 70. Therefore, because control line 60 can be spooled onto reel 70, system 20 can be easily transported to remote locations. Control line 60 can then be unspooled and ran into a well bore through the use of conventional coiled tubing equipment, including the use of conventional control vehicles having facilities and equipment for operating and monitoring system 20. Moreover, control line 60 having outer jacket 49 provides for better well control capability during the operation since conventional strippers and blowout preventers can seal off tubular-shaped lines.

Liquid liner component transmission lines 31, 41, 51 may have any inner diameter and outer diameter desired or necessary to effectively transmit, or deliver, liquid liner components 35, 45, 55 to application site 95. Preferably, liquid liner component transmission lines 31, 41, 51 have small inner and outer diameters, i.e., less than 0.75 inch and less than 1.0 inch, respectively. Therefore, liquid liner component transmission lines 31, 41, 51 can be easily twisted, or coiled, together and ran in and out of a well bore as a single control line 60.

Still referring to FIGS. 1–3, liquid liner component transmission lines 31, 41, 51 are in communication with applicator 90. Applicator 90 may include mixing cup 91 and spray head 92. Mixing cup 91 may include an agitator (not shown) or other mixing apparatus to facilitate mixing liquid liner components 35, 45, 55 to form multi-component liquid liner composition 93.

Spray head 92 may be any device known to persons skilled in the art that facilitates the dispersion of the multi-component liquid liner composition 93 onto inner surface 82 of conduit 80 to sufficiently coat inner surface 82. Spray head 92 may include one or more ports 94 through which multi-component liquid liner composition 93 is expelled, e.g., sprayed, extruded, centrifugally dispersed, from applicator 90. Each port 94 may provide directional spraying, i.e., one direction, or radial spraying, i.e., multiple directions. Preferably, each port 94 provides radial spraying.

Additionally, applicator 90 may include a centralizer 99 to assist in maintaining a uniform coverage of multi-component liquid liner composition 93 being applied to inner surface 82 of conduit 80 by helping to maintain spray head 92 in the center of conduit 80. It is to be understood that centralizer 99 may be an integral part of applicator 90; may be an additional device attached to applicator 90; may be disposed above or below spray head 92; and may be separate from spray head 92, e.g., attached to control line 60.

Applicator 90 may be any mechanical, electrical, pneumatic, or hydraulic device known to persons ordinarily skilled in the art that permits a liquid to be applied to a surface without contacting the surface. In the embodiments in which the applicator is electrical, pneumatic, or hydraulic, control line 60 includes a power source line 48 in communication with applicator 90 and a power source 47 (FIG. 1). For example, electric applicators require an electrical cable as power source line 48 in communication with the applicator 90 and an electric generator (power source 47). Likewise, pneumatic and hydraulic applicators 90 require a pneumatic line and a hydraulic fluid line, respectively, as power source line 48 in communication with the applicator 90 and a pneumatic compressor and a hydraulic fluid tank/hydraulic pump, respectively, as power source 47. Power source line 48 is preferably a pneumatic line and power source 47 is preferably a pneumatic compressor.

Additionally, power source line 48 is preferably coiled, or twisted, with liquid liner component transmission lines 31, 41, 51 to form control line 60, and thus, is protected by outer jacket 49. As shown in FIG. 3, control line 60 includes three spirally twisted liquid liner component transmission lines 31, 41, 51 and power source line 48.

It is noted that a second power source line 48 may be desired or necessary to facilitate operation of applicator 90. For example, in the embodiment in which power source line 48 is a hydraulic line, a second power source line, also a hydraulic line, in communication with power source 47 is necessary for proper function of a hydraulic applicator 90.

In a preferred embodiment, liquid liner component transmission lines 31, 41, 51 are in communication with a multi-port chemical, or fluid, metering pump 65. Multi-port pump 65 facilitates the delivery of liquid liner components 35, 45, 55 from reservoirs 30, 40, 50, through liquid liner component transmission lines 31, 41, 51 to applicator 90. While it is contemplated that any multi-port pump 65 may be included in system 20, multi-port pump 65 should keep at least two of the liquid liner components separate to facilitate proper delivery, or transmission, of the liquid liner components to applicator 90 without the multi-component liquid liner composition 93 curing prematurely. Further, multi-port pump 65 preferably pumps pre-determined amounts of at least two liquid liner components up to about 3,000 psi to about 5,000 psi.

The invention is also directed to methods of applying a multi-component liquid liner composition to the inner surface of a conduit through the use of multiple, individual small diameter liquid liner component transmission lines. The methods may be used to restore the integrity of old corroded or eroded conduits providing longer operational life and avoiding costly removal and replacement. The methods of the invention may also be used to protect new, already installed conduits from corrosion or erosion due to liquids or solids transported through them.

Conduits of various lengths can be internally coated, or treated, for a wide range of applications, including oil and gas production tubing, i.e., well bore tubing, petroleum products pipelines, water lines, sewer lines, and other city utilities, whether the conduit is disposed horizontally, vertically, or diagonally. In a surprisingly advantageous application, the conduit is a vertically (FIG. 2) or diagonally disposed production tubular having an outer surface 81 and an inner surface 82. Inner surface 82 may be coated with a multi-component liquid liner composition 93 in accordance with the methods of the invention at application sites 95 located at distances greater than 200 feet from the opening 83 of the conduit 80. As shown in FIGS. 1–2, conduit 80 is a production tubular vertically disposed in ground 100.

The methods of the invention permit a continuous or intermittent flow of liquid liner components 35, 45, 55 to be pumped down liquid liner component transmission lines 31,41, 51 and sprayed, extruded, or centrifugally applied in a radial pattern onto inner surface 82 of conduit 80.

Multi-component liquid liner composition 93 may be applied over the entire length of inner surface 82 of conduit 80 or in selected, or predetermined, areas, e.g., application site 95. Additionally, applicator 90 may be moved along inner surface 82 of conduit 80 in the direction of arrows 96, 97 (FIG. 2) to apply multi-component liquid liner composition 93 to larger areas of inner surface 82.

Intermittent coating of inner surface 82 of conduit 80 with multi-component liquid liner composition 93 may be controlled by engaging and disengaging multi-port pump 65 which is used to transmit liquid liner components 35, 45, 55 to applicator 90. Multi-port pump 65 is preferably a positive displacement pump that provides an individually controlled or metered amount of each liquid liner component 35, 45, 55 being transmitted through liquid liner component transmission lines 31,41,51. In a preferred embodiment, liquid liner components 35,45,55 are mixed in mixing cup 91 located at, or within (FIG. 2) applicator 90 and applied to inner surface 82 of conduit 80 using spray head 92.

The method of applying multi-component liquid liner compositions may be interrupted or spray patterns changed by disengaging multi-port pump 65 and by using surface or downhole valves in control line 60, or in liquid liner component transmission lines 31, 41, 51, operated by electric, hydraulic, pneumatic, or mechanical actuators. The rate at which multi-component liquid liner composition 93 is applied and thickness at which multi-component liquid liner composition 63 is applied can be adjusted without having to remove control line 60, and/or liquid liner transmission lines 31, 41, 51, and spray head 92 from conduit 80 to make manual adjustments. Intermittent coating can also be used to avoid coating areas along inner surface 82 that may be adversely affected by multi-component liquid liner composition 93, such as gas lift valves and nipple profiles.

As mentioned above, electrical solenoid actuators for downhole control valves would require the use of a power source line 48, e.g., an electric cable, that can be twisted together with the liquid liner component transmission lines 31,41,51 (FIG. 3). If desirable, and cost effective, the electrical cable may also be used to operate downhole tools and record information such as location of conduit couplings, temperature in conduit 80, multi-component liquid liner composition 93 coating thickness, depth and pressure measurements, and other data.

In one embodiment of the invention, the method of applying a multi-component liquid liner composition 93 to inner surface 82 of conduit 80 includes the steps of transmitting first liquid liner component 35 to application site 95 disposed on inner surface 82 of conduit 80. Second liquid liner component 45 is then transmitted to application site 95 and mixed with first liquid liner component 35 at application site 95 to form a multi-component liquid liner composition 93. Multi-component liquid liner composition 93 is applied to inner surface 82 of conduit 80 at application site 95, thereby coating inner surface 82 of conduit 80.

It is to be understood that the phrase "at application site" is to be broadly construed to include any position located within conduit 80 near or in close proximity to the application site 95. As shown in FIG. 2, application site 95 is identified as being the area around applicator 90.

As discussed above, multi-component liquid liner composition 93 may be applied to inner surface 82 using applicator 90. Applicator 90 may spray, extrude, or centrifugally apply multi-component liquid liner composition 93 to inner surface 82. Additionally, applicator 90 may include a spray head 92 that provides directional spraying, i.e., the multi-component liquid liner composition 93 is applied in only one direction from one port 94 located on spray head 92 (although spray head 92 may include multiple ports 94, wherein each port 94 is oriented to spray in a different, fixed, direction), or radially spraying, i.e, the multi-component liquid liner composition 93 is applied in multiple directions from each of one or more ports 94 located on spray head 92.

Liquid liner components 35,45 may be transmitted to application site 95 through liquid liner component transmission lines 31 and 41 respectively. Moreover, liquid liner components 35,45 may be transmitted to application site 95 by pumping liquid liner components 35, 45 from reservoirs 30 and 40 respectively, and through liquid liner component transmission lines 31 and 41 respectively.

Additional liquid liner components, e.g., 55 discussed above, may also be transmitted to application site 95 and mixed with the other liquid liner components, i.e., 35, 45, to form multi-component liquid liner composition 93 that is applied to inner surface 82 of conduit 80 at application site 95.

In another specific embodiment, the method of applying a multi-component liquid liner composition 93 to inner surface 82 of conduit 80 includes the steps of transmitting first liquid liner component 35 to application site 95 disposed on inner surface 82 of conduit 80 and applying first liquid liner component 35 to inner surface 82 of conduit 80 at application site 95. Second liquid liner component 45 is then transmitted to application site 95 and applied to inner surface 82 of conduit 80 at application site 95, thereby forming multi-component liquid liner composition 93 disposed on inner surface 82 of conduit 80 at application site 95.

Additional liquid liner components, e.g., 55 discussed above, may also be transmitted to application site 95 and applied to inner surface 82 of conduit 80 at application site 95 to form multi-component liquid liner composition 93 at application site 95.

While one of the specific embodiments discussed above includes three reservoirs and three liquid liner component transmission lines, it is to be understood that the system may include any number of reservoirs and liquid liner component transmission lines as desired or necessary to facilitate the application of a multi-component liquid liner composition to the inner surface of a conduit. For example, a specific multi-component liquid liner composition that is desired by the operator of the system because of conditions, e.g., temperature, humidity, pressure, etc., at the application site may include as few as two different liquid liner components, or as many as four or more different liquid liner components. In these embodiments, a number of reservoirs and liquid liner component transmission lines will be determined by the operator based upon the specific liquid liner components selected by the operator. For example, if four liquid liner components are selected, and all four of the liquid liner components must be kept separated for as long as possible before being combined to form the multi-component liquid liner composition and applied to the inner surface of the conduit, then four reservoirs and four liquid liner component transmission lines are necessary.

Alternatively, if only three of the four liquid liner components must be kept separate, i.e., two of the four liquid liner components may be mixed or combined in one reservoir prior to transmitting them to the application site on the inner surface of the conduit, then only three reservoirs and three liquid liner component transmission lines are necessary. The ability to select the number of reservoirs and liquid liner component transmission lines is within the knowledge of a person ordinarily skilled in the art of formulating multi-component liquid composition liners.

Additionally, any of the liquid liner components may be identical to one another provided at least two of the liquid liner components are different, and the two different liquid liner components are stored in separate reservoirs and transmitted to the application site through separate liquid liner component transmission lines.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. A system for applying a multi-component liquid liner composition to an inner surface of a pressure containment production tubular comprising:
    a first reservoir having a first liquid liner component;
    a second reservoir having a second liquid liner component, the second liquid liner component being different from the first liquid liner component;
    a first liquid liner component transmission line in communication with the first reservoir;
    a second liquid liner component transmission line in communication with the second reservoir; and
    a pressure containment production tubular applicator in communication with the first liquid liner component transmission line and the second liquid liner component transmission line.

2. The system of claim 1, wherein the first and second reservoirs and first and second liquid liner component transmission lines are in communication with a multi-port pump.

3. The system of claim 1, wherein the first and second liquid liner component transmission lines are adjacent each other to form a control line.

4. The system of claim 3, wherein the control line includes a power source line.

5. The system of claim 4, wherein the power source line is electric.

6. The system of claim 4, wherein the power source line is pneumatic.

7. The system of claim 3, wherein the control line is coiled.

8. The system of claim 3, wherein the control line is maintained on a reel.

9. The system of claim 1, wherein the applicator is a directional spray nozzle.

10. The system of claim 1, wherein the applicator is a centrifugal spray nozzle.

11. The system of claim 1, wherein the first and second liquid liner component transmission lines are coiled.

* * * * *